Figure 1:
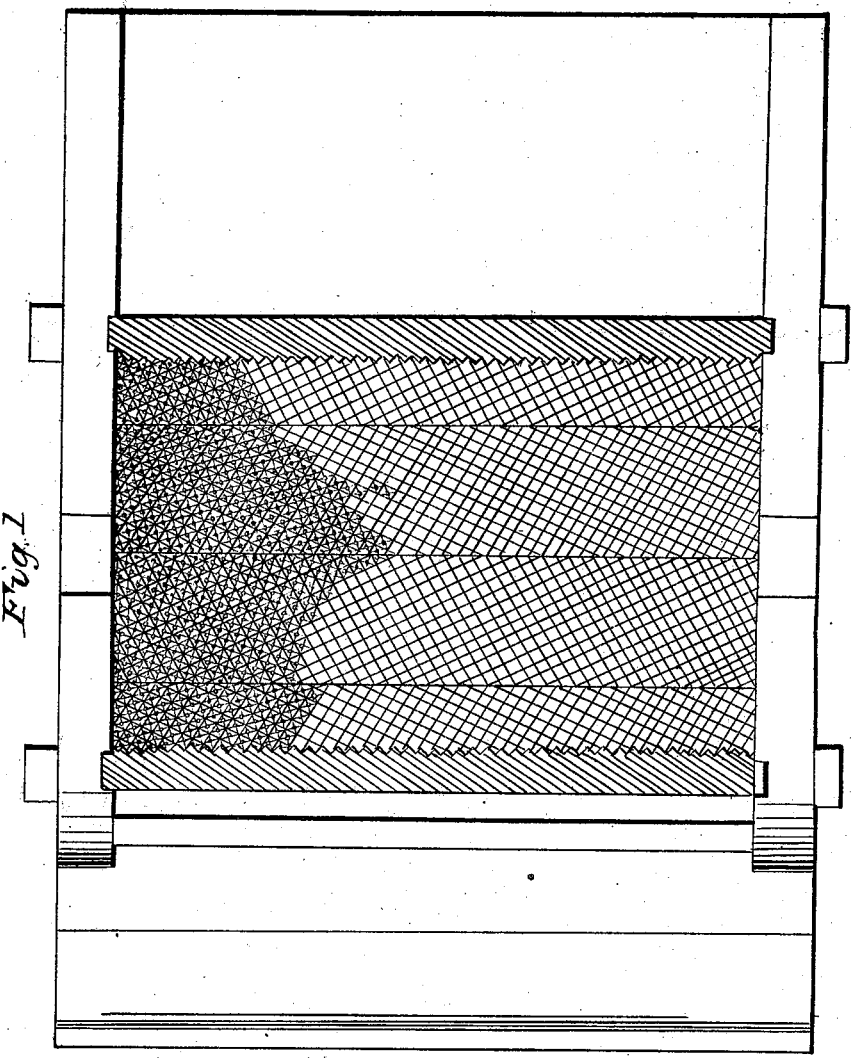

C. REIF.
Clover Huller.

No. 24,237.

2 Sheets—Sheet 1.

Patented May 31, 1859.

Witnesses

Inventor
Christian Reif

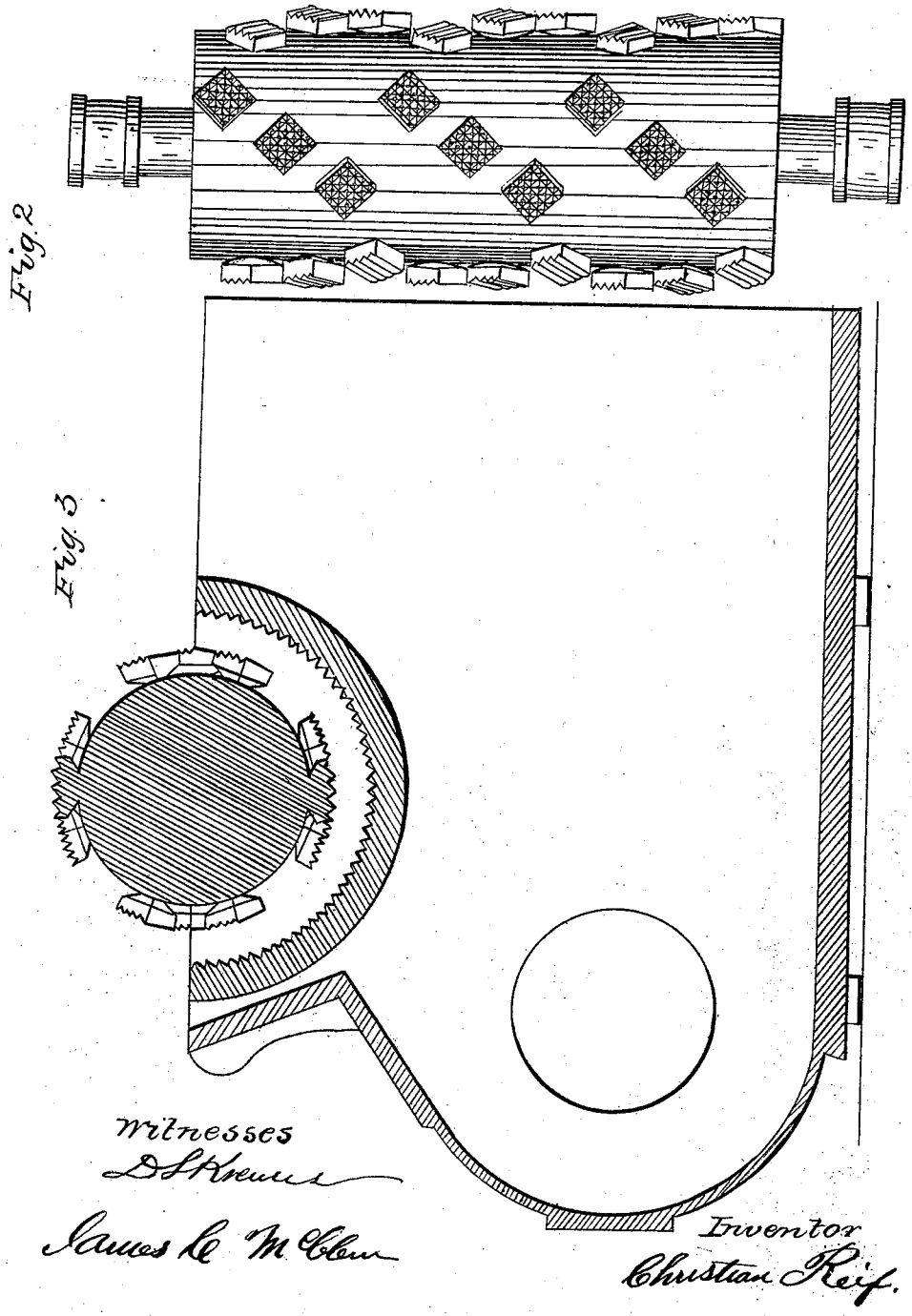

UNITED STATES PATENT OFFICE.

CHRISTIAN REIF, OF HARTLETON, PENNSYLVANIA.

CLOVER-HULLER.

Specification of Letters Patent No. 24,237, dated May 31, 1859.

*To all whom it may concern:*

Be it known that I, CHRISTIAN REIF, of Lewis township, in the county of Union and State of Pennsylvania, have invented a new and useful Improvement in Clover-Hullers; and I do hereby declare that the following is a full, clear, and exact description of the same, reference being had to the annexed drawing, forming part of this specification, in the several figures of which similar characters of reference denote the same part.

Figure 1 is a view of the inside of the concave showing the angles at which the projections are placed. Fig. 2 is a view of the cylinder which revolves in the concave. Fig. 3 is a view of the cylinder in position in the concave.

The nature of my invention consists in concave composed of a series of cast iron plates the faces of which are covered with pyramidal projections which are placed at different angles on each plate so as to prevent a continuous row of projections, or depressions, either around, or down the concave as the clover might be carried through the machine without being caught by the projections, were the depressions in a straight row, but by having them at different angles each depression is followed by a projection thus preventing the clover from running through a series of depressions without coming in contact with a projection. In this concave revolves the cylinder which has reversed spiral rows of projections or rubbers, so that when it revolves in the concave the clover is brought in contact with the projections on the concave and those on the cylinder; thus hulling the clover.

In the drawing A is the concave, with its pyramidal projections, B is the cylinder, with its spiral rows of projections C C C.

When the clover is placed in the concave, and the cylinders revolved, it is brought in contact with projections on the cylinder, and those on the concave and the hull removed. The projections on the concave being at different angles on the several plates composing it, causes a depression always to be followed by a projection, and thus prevents the clover from being carried through the machine in a continuous row of depressions without having the hull taken off.

Having thus described my invention I claim—

The projections at different angles on the concave in combination with the spiral rows of projections on the cylinder, substantially as and for the purpose set forth.

In testimony whereof I have hereunto signed my name before two subscribing witnesses.

CHRISTIAN REIF.

Witnesses:
JOSEPH BOUNCE,
JONATHAN YOUNT.